United States Patent [19]

Kahler

[11] Patent Number: 5,056,027

[45] Date of Patent: Oct. 8, 1991

[54] APPARATUS AND METHOD FOR A SMOOTH TRANSITION BETWEEN CALIBRATED AIRSPEED CONTROL OF AN AIRCRAFT AND MACH NUMBER CONTROL OF AN AIRCRAFT

[75] Inventor: Jeffery A. Kahler, Phoenix, Ariz.

[73] Assignee: Honeywell Inc., Minneapolis, Minn.

[21] Appl. No.: 485,258

[22] Filed: Feb. 26, 1990

[51] Int. Cl.⁵ ............................................. G06F 15/50
[52] U.S. Cl. ..................................... 364/433; 364/440;
   244/180; 244/182
[58] Field of Search ....................... 364/440, 433, 434;
   244/180, 181, 182

[56] References Cited

U.S. PATENT DOCUMENTS

| | | | |
|---|---|---|---|
| 3,617,721 | 11/1971 | Foster | 364/558 |
| 3,743,221 | 7/1973 | Lykken et al. | 364/433 |
| 4,764,872 | 7/1986 | Miller | 364/433 |
| 4,792,906 | 8/1986 | King et al. | 364/448 |
| 4,849,900 | 5/1986 | Blight et al. | 364/434 |

Primary Examiner—Parshotam S. Lall
Assistant Examiner—Gary D. Yacura
Attorney, Agent, or Firm—D. E. Jepsen; D. J. Lenkszus; A. Medved

[57] ABSTRACT

Apparatus and an associated method are described for an aircraft for providing an auto-changeover procedure from a calibrated airspeed control parameter to a Mach number control parameter when the aircraft is ascending; and, from a Mach number control parameter to a calibrated airspeed parameter when the aircraft is descending. The auto-changeover procedure is responsive to application of preselected calibrated airspeed and Mach number parameters. The data processing unit of the aircraft provides a continually updated prediction of the target parameter that would result should the aircraft execute the auto-changeover under the currently existing conditions. When the predicted value and the preselected value are equal, the changeover procedure is invoked, reducing the transients resulting from overshoot of the target parameter value. Provision is made for the circumstance wherein the changeover is determined by an altitude rather than a target parameter. Approximation equations for reducing the computational requirements are discussed.

19 Claims, 13 Drawing Sheets

APPARATUS AND METHOD FOR A SMOOTH TRANSITION BETWEEN CALIBRATED AIRSPEED CONTROL OF AN AIRCRAFT AND MACH NUMBER CONTROL OF AN AIRCRAFT

BACKGROUND OF THE INVENTION

1. Field of the Invention

This invention relates generally to the flight control of an aircraft and, more particularly, to providing a smooth transition of an aircraft between aircraft flight operating in response to the calculated airspeed value and aircraft flight operating in response to the Mach number value.

2. Description of the Related Art

In the modern aircraft, low altitude control of an aircraft is performed in relationship to the calibrated airspeed (CAS) of the aircraft, while the high altitude control of aircraft is performed in relationship to the Mach number. When climbing to or descending from a high cruising altitude, it is necessary for the control apparatus of the aircraft to make the transition between response to the calibrated airspeed and the Mach number. Generally, a calibrated airspeed parameter or Mach number parameter is preselected by the flight deck of the aircraft, the preselected parameter being the parameter value for the aircraft after the transition. In the alternative, the flight deck of an aircraft can select an altitude (typically 26,000 feet) at which the transition is to take place.

However the transition of the control between the calibrated airspeed value and the Mach number value can involve overshoot of the preselected target aircraft speed. The calibrated airspeed and the Mach number are related by the true airspeed (TAS). When the aircraft is changing altitude while holding a selected calibrated air speed, the expression to convert the calibrated airspeed to the true airspeed is given by the expression:

$$TAS = \{7 \times G \times R \times T[\{(P_o/P)[\{1+0.2(CAS/C_o)^2\}^{3.5} -1]+1\}^{(2/7)} -1]\}^{\frac{1}{2}} \quad 1.$$

where:
T = ambient temperature (°K)
$P_o$ = sea level air pressure (2116.2 lb/ft$^2$)
$C_o$ = sea level speed of sound (661.45 knots)
R = ideal gas constant (96.03 ft/°K)
G = sea level acceleration of gravity (32.174 ft/sec$^2$)
P = static pressure (lb/ft$^2$)

From the foregoing equation, the true air speed increases as temperature increases and decreases as pressure increases. However, the changes in pressure are more important during a change in altitude. The result is a positive acceleration along the flight path during a climb and a negative acceleration during descent in the flight path, i.e., when the specific calibrated airspeed is maintained.

The corresponding expression for true airspeed in terms of the Mach number is:

$$TAS = (1.4 \times G \times R \times T)^{\frac{1}{2}}(\text{Mach number}) \quad 2.$$

where G, R, and T have been previously defined.

Referring to equation 2, when the Mach number is held constant, the true air speed increases with temperature. Because the temperature decreases with increasing altitude in the troposphere, a negative flight path acceleration results for the true air speed during an increase in altitude and positive flight path acceleration occurs for the true air speed during a negative change in altitude when the Mach number is held constant. (The derivation of the true air speed equations 1 and 2 can be found in Airplane Aerodynamics and Performance, Tau Edward Lan and Jan Roskam, Roskam Aviation, 1980, pages 15-25).

Because of the acceleration (positive or negative) of the true airspeed for a change in altitude, when the transition between the constant calibrated airspeed and the constant Mach number occurs, an overshoot in the target control parameter (i.e., the calibrated air speed or the Mach number) is experienced with the corresponding requirement to adjust the control parameter to the selected value.

In the prior art, transfer was made to the alternative parameter when the calibrated airspeed or the Mach number reached the preselected value of the alternate parameter. The preselected value of the alternative parameter was subject to overshoot, causing the aircraft to reverse the acceleration after transfer to the alternative parameter.

A need has therefore been felt for apparatus and an associated method to provide smooth transition from an aircraft operating in response to a constant calibrated airspeed parameter to a constant Mach number parameter or to provide a smooth transition when the control parameter of the aircraft changes from the calibrated airspeed to the Mach number at a preselected altitude.

FEATURES OF THE INVENTION

It is an object of the present invention to provide improved control of the flight of an aircraft.

It is a feature of the present invention to provide for a smooth transition between the flight of an aircraft controlled by a calibrated airspeed parameter and the flight of an aircraft controlled by Mach number parameter.

It is another feature of the present invention to provide improved operation for an aircraft for which the control of an aircraft changes from a calibrated airspeed parameter to a Mach number parameter.

It is yet another feature of the present invention to calculate a predicted target parameter value based on the present flight conditions and to change to the target parameter for control of the aircraft when the predicted target parameter value is equal to a preselected value of the target parameter.

It is a further feature of the present invention to provide approximation equations to reduce the processing requirements of the aircraft data processing system.

SUMMARY OF THE INVENTION

The aforementioned and other features are attained, according to the present invention, by providing an algorithm for use by the avionics apparatus and the apparatus controlling the flight of the aircraft that provides for an automatic and smooth transition between an aircraft controlled by a calibrated flight parameter and an aircraft controlled by a Mach number parameter. An algorithm is provided to predict, based on present flight conditions, the value of a target parameter. When the target parameter value is predicted, then the transition to the target parameter is implemented. Otherwise, the transition to the target parameter is executed at a predetermined altitude. The algorithm used to predict the value of the target parameter includes the flight path acceleration. Approximation equations for reducing the computational requirement of the algorithm are described.

These and other features of the invention will be understood upon reading of the following description along with the drawings.

DESCRIPTION OF THE PREFERRED EMBODIMENT

Detailed Description of the Figures

Figure 1:
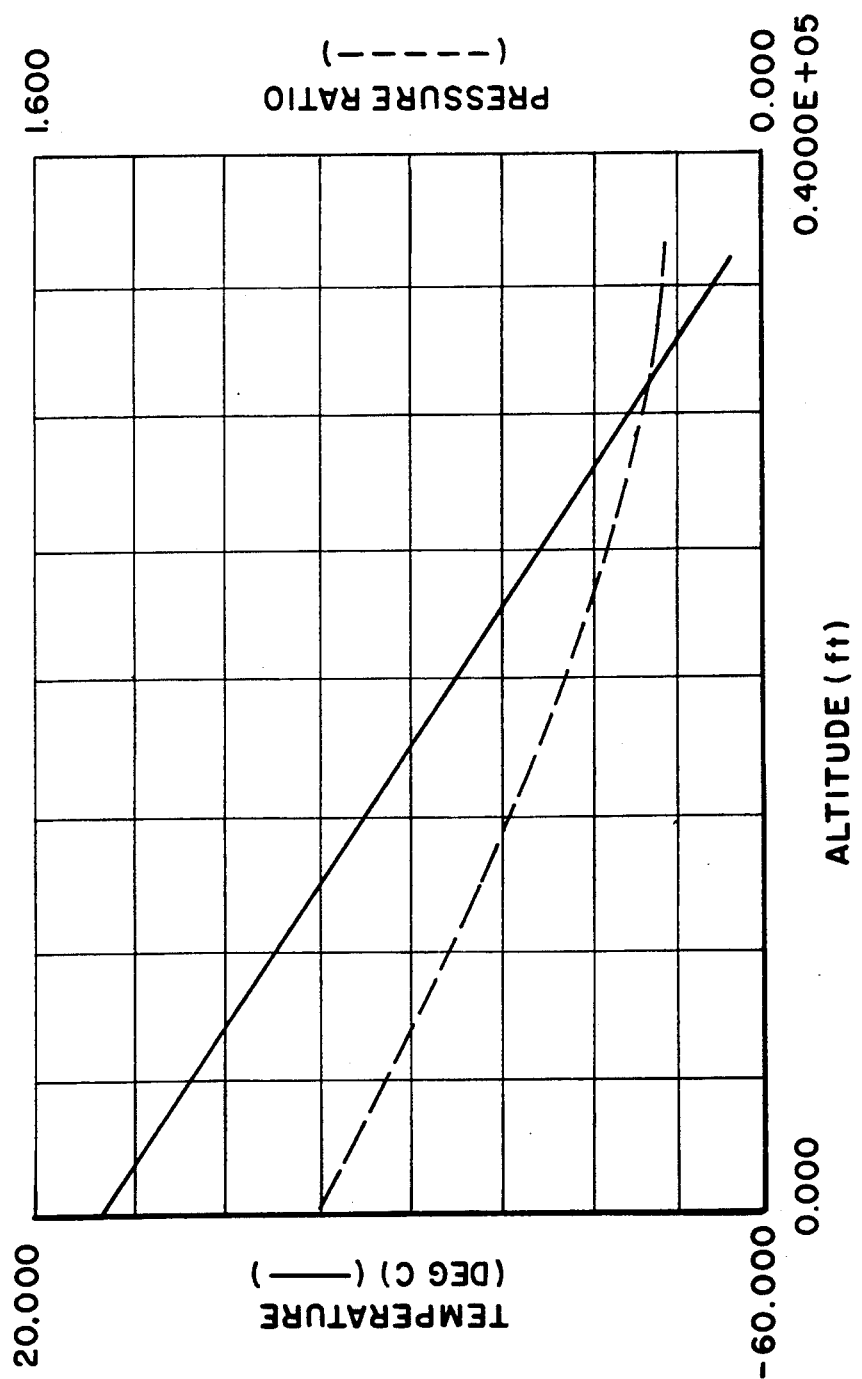
FIG. 1 is a graph of the average temperature and the pressure ratio as a function of altitude.

Referring now to FIG. 1, the average temperature and pressure ratio are shown as a function of altitude. The temperature and pressure ratio can be calculated as a function of altitude by using the expressions:

$$T = T_o[1 - 6.875 \times 10(^{-6}) \times H] - 273.15 \; (^\circ C) \qquad 3.$$

$$PR = (1 - 6.875 \times 10(^{-6}) \times H)^{5.2541} \qquad 4.$$

where:
$T_o = 288.15 ^\circ K$
H = altitude (ft), and $$PR = P/P_o$$

The change in the temperature and pressure is responsible for the flight path acceleration (or deceleration) when the flight of the aircraft is controlled by the calibrated airspeed or the Mach number. The derivation of equations 3 and 4 is given on pages 1–6 of Lan et al, cited above).

Figure 2:
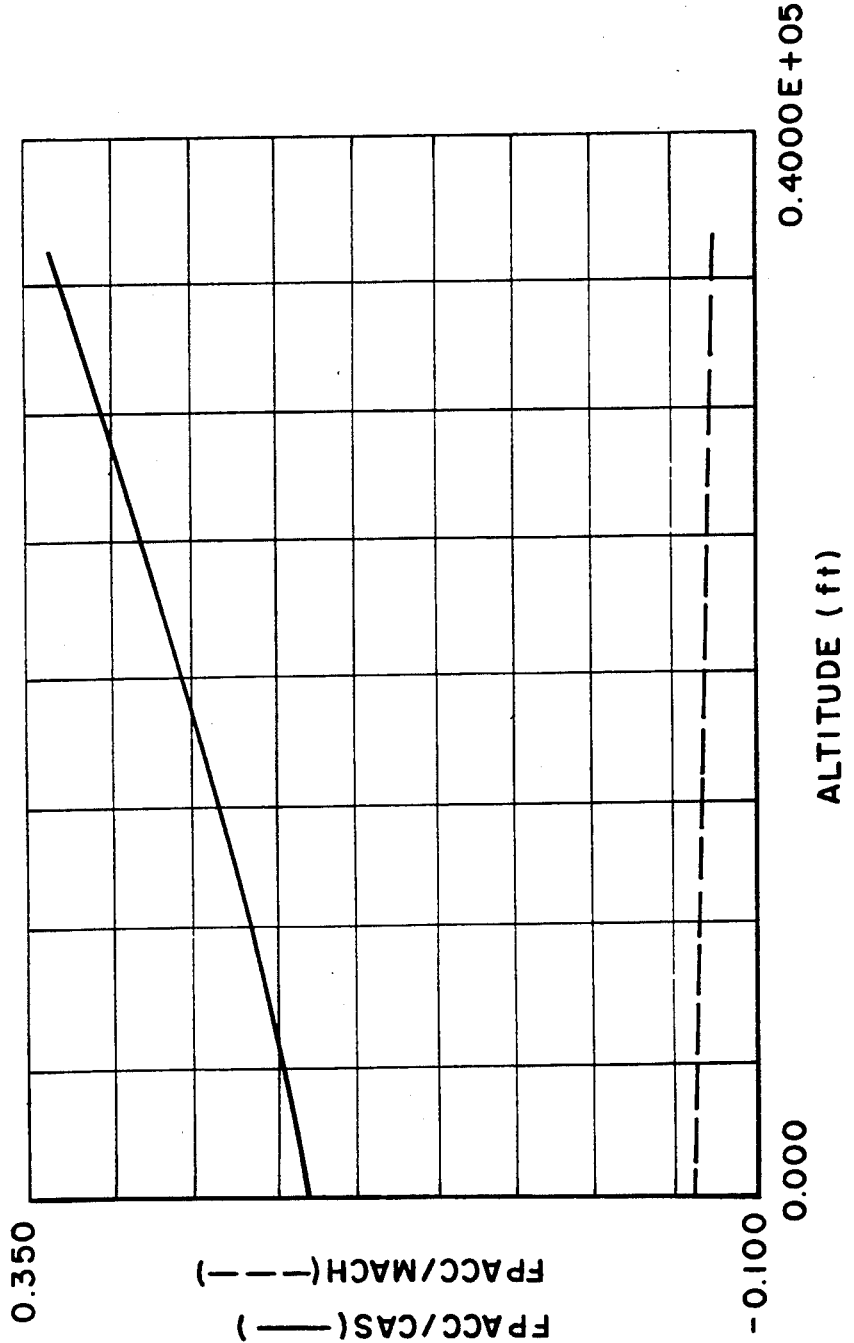
FIG. 2 is a graph of the flight path acceleration for the calibrated airspeed parameter and for the Mach number for a constant vertical air speed.

Referring now to FIG. 2, the flight path acceleration for a calibrated airspeed and for a Mach number with a vertical speed of 1500 ft/sec (a typical rate of vertical change at 30,000 ft) is shown. FIG. 2 is derived by calculating a digital derivative for the true airspeed equations. This acceleration is the origin of the overshoot problem.

Figure 3:
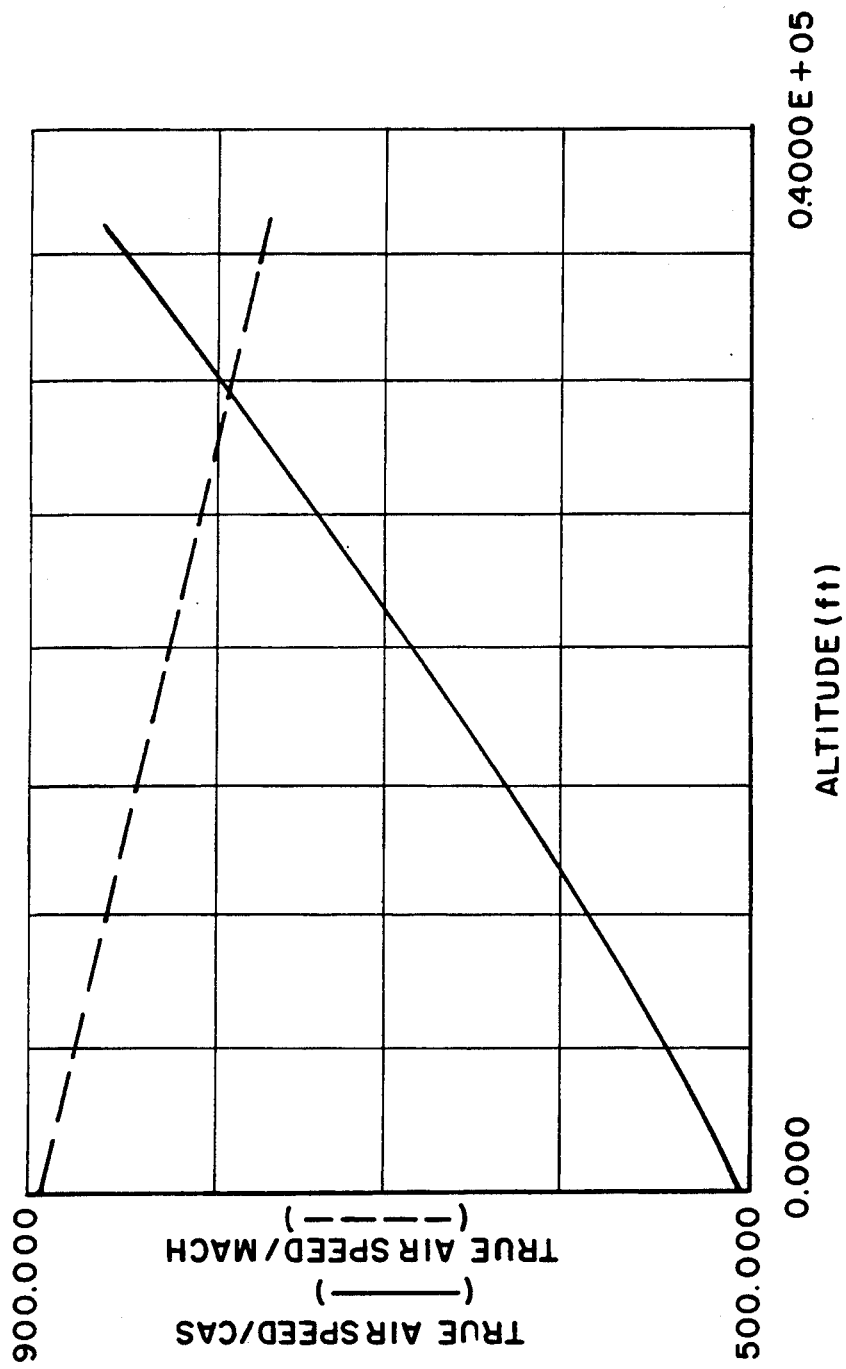
FIG. 3 illustrates the true airspeed of an aircraft from sea level to 36,000 ft. for a given calibrated airspeed and for a given Mach number.

Referring to FIG. 3, the true airspeed is shown for an aircraft for a calibrated airspeed of 300 knots and for a Mach number of 0.8 from sea level (0 ft) to 36,000 ft. In an actual flight plan according to the present invention, the aircraft would ascend on the calibrated airspeed curve until the intersection value with the Mach number curve is approached. Prior to actually reaching the intersection value, the auto-changeover to the new airspeed parameter is executed. The aircraft thereafter smoothly approaches the Mach number curve, but does not cross the line. On descent, the aircraft follows the Mach number curve until the cross-over value of the Mach number curve and the calibrated airspeed curve is approached. Prior to reaching the cross-over value, the aircraft control is transferred to the calibrated airspeed curve (i.e., the calibrated airspeed equal 300 knots) by means of auto-changeover procedure. The control of the aircraft is transferred to the calibrated airspeed parameter smoothly. (The curves of FIG. 3 are terminated at 36,000 ft because of the transition, at this altitude, to new atmospheric conditions).

Figure 4:
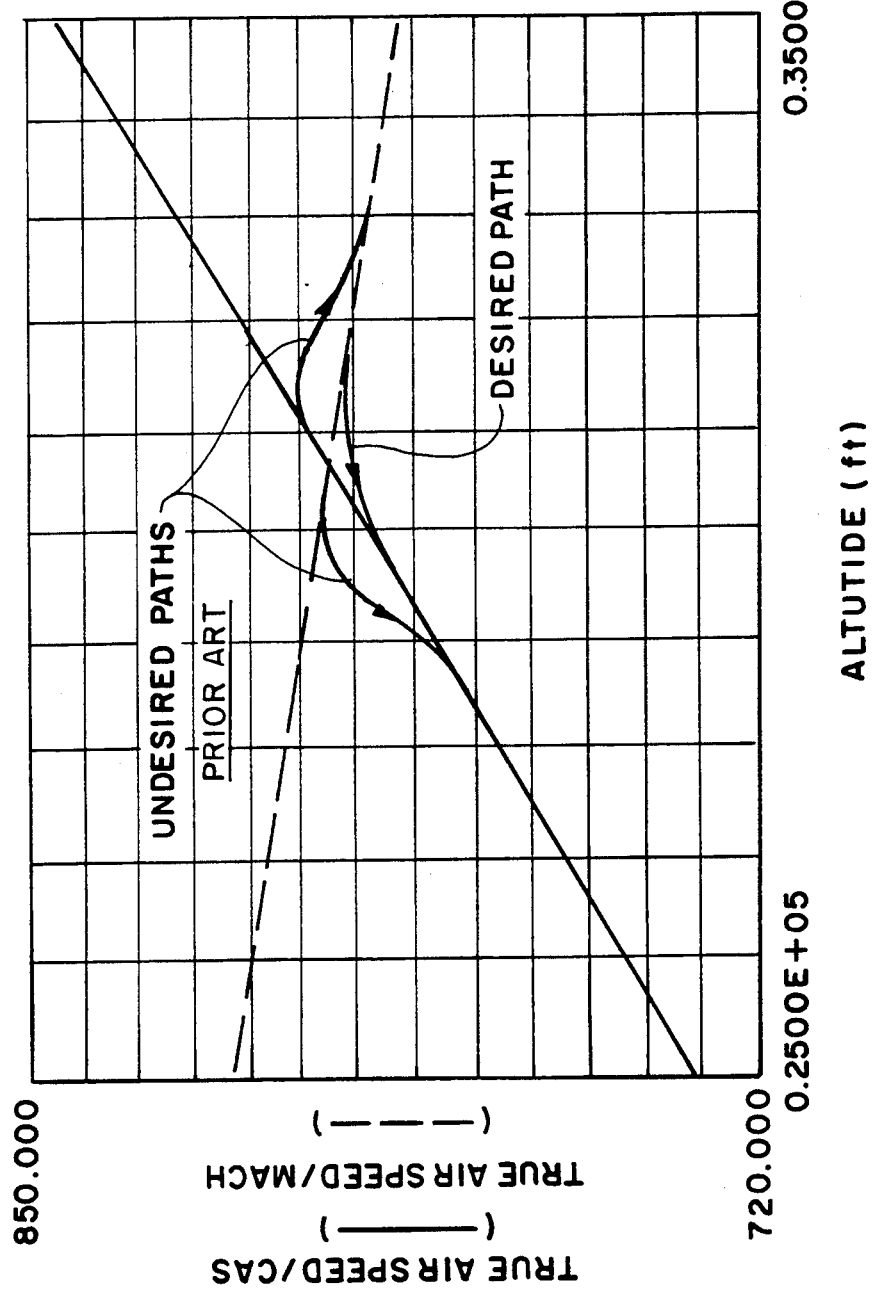
FIG. 4 illustrates the transition between the aircraft control parameters according to the prior art and according the present invention.

Referring next to FIG. 4, the aircraft control parameter cross-over region for the calibrated airspeed curves and for the Mach number curves of FIG. 3 is shown with an expanded scale. Included in the FIG. 4 is the result of the auto-changeover between the calibrated airspeed parameter and the Mach number parameter on the true airspeed according to the prior art (undesired path) and according to the present invention (desired path).

Figure 5:
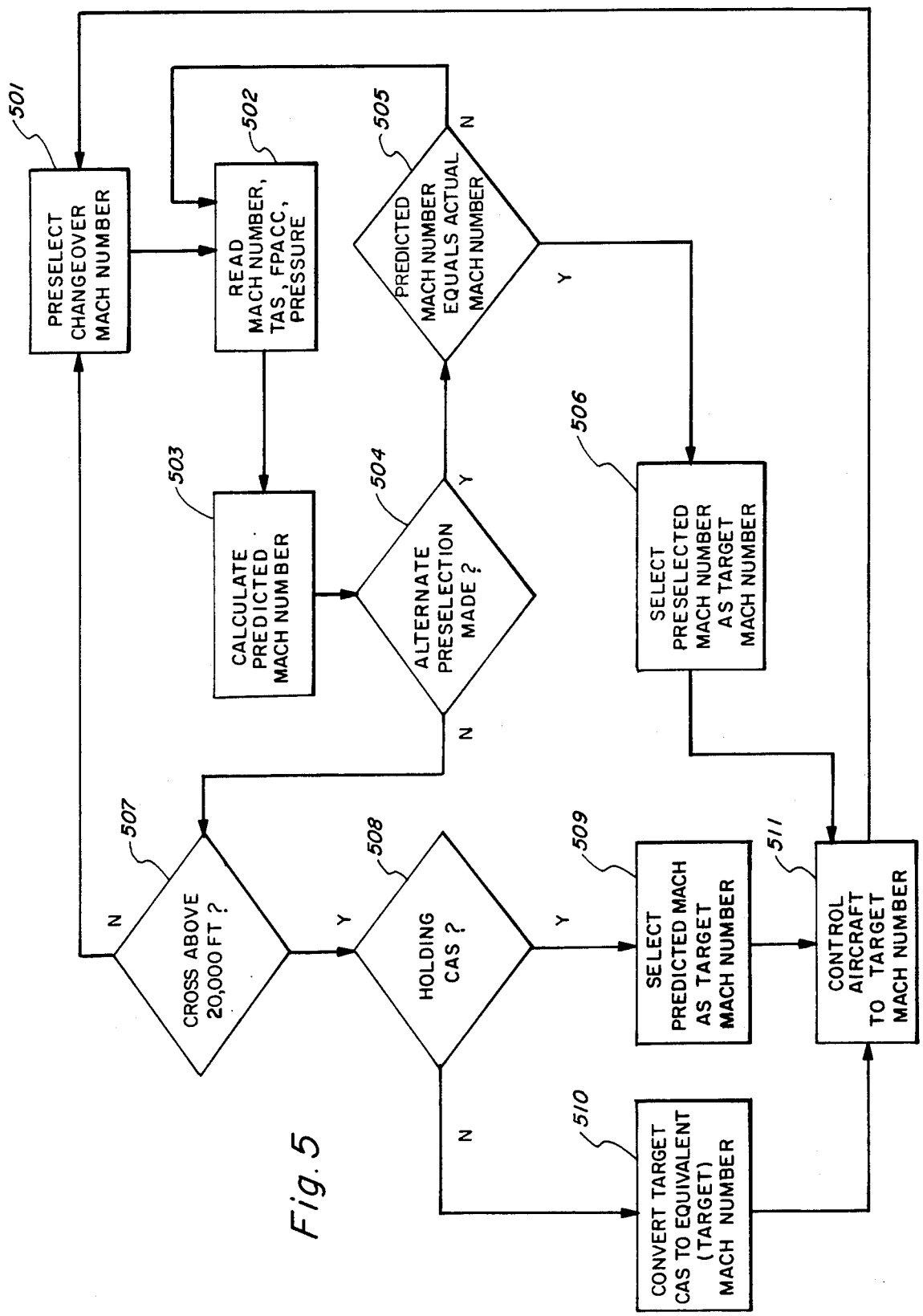
FIG. 5 is a flow diagram of the process for auto-changeover from the calibrated airspeed parameter to the Mach number parameter according to the present invention.

Referring next to FIG. 5, the auto-changeover process for transferring control of the aircraft from the calibrated airspeed parameter to the Mach number parameter, according to the present invention, is shown. In step 501, a target Mach number is selected, i.e., by the aircraft flight deck, crew which will determine when the changeover is to occur. In step 502, the data processing apparatus, in response to parameters identified by the aircraft sensing apparatus, determines the current Mach number, the true airspeed, the flight path acceleration and the static pressure parameters of the aircraft. Based on the selected Mach number, the true airspeed, and the flight path acceleration, the data processing apparatus of the aircraft calculates a predicted Mach number which is required for a smooth transfer from the calibrated airspeed parameter control of the aircraft to the Mach number parameter control of the aircraft in step 503. In step 504, a determination is made as to whether a selected Mach number has been entered by the flight deck. When the flight deck has entered a selected Mach number, then a comparison is made to determine if the predicted Mach number is equal to, within prescribed tolerances, the present aircraft Mach number in step 505. When the present Mach number and predicted Mach number are not equal with in the prescribed tolerances, then the procedure is returned to step 502. When the present Mach number and the predicted Mach number are equal, then auto-changeover procedure by which the calibrated airspeed is replaced by the preselected Mach number. When a preselected Mach number has not been entered by the flight deck in step 504, then a determination is made as to whether the current altitude of the aircraft is greater than or equal to 26,000 ft. in step 507. When the aircraft is below 26,000 ft in 15 step 507, then the procedure is returned to step 501 where the option to preselect a target Mach number can be implemented. When, in step 507, the altitude is equal to, or above, 26,000 ft, then a determination is made as to whether a target (selected) calibrated airspeed is being maintained by the aircraft within preselected limits in step 508. The calibrated airspeed that has been selected will typically be maintained within specified limits unless, for example, a new calibrated airspeed has been selected for the aircraft and the aircraft is still in the process of adjusting to the newly selected target calibrated airspeed. When the calibrated airspeed is being maintained by the aircraft in step 508, then the predicted Mach number is selected as a new target in step 509. When the calibrated airspeed is not being maintained by the aircraft, then the target calibrated airspeed is converted to the equivalent Mach number. The Mach number from step 506, step 509, or from 510 is used provide the Mach number resulting from the changeover controlling the flight of the aircraft.

Figure 6:
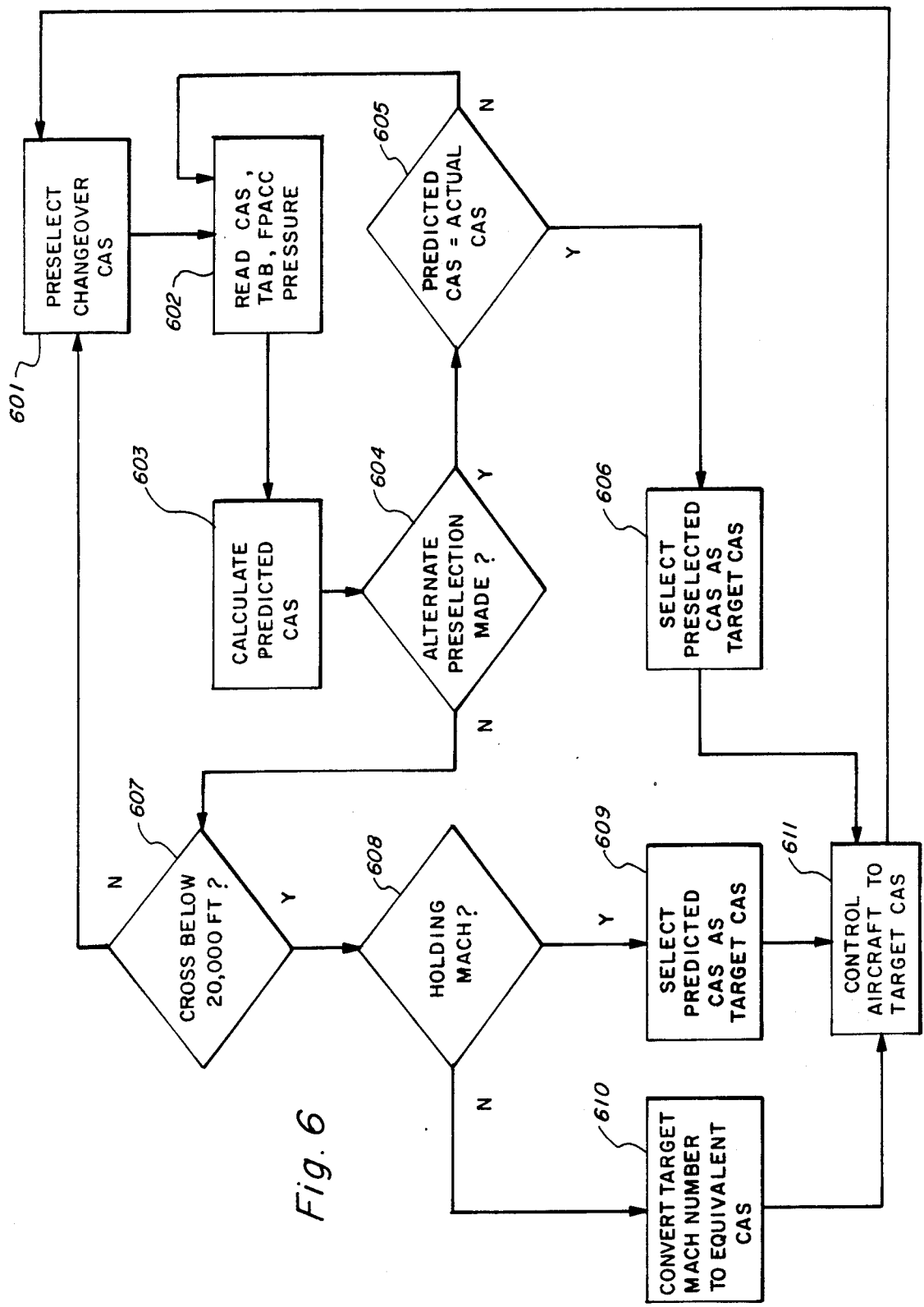
FIG. 6 is a flow diagram of the process for auto-changeover from a Mach number control of an aircraft to calibrated airspeed control of the aircraft.

Referring next to FIG. 6, the procedure for auto-changeover from a Mach number control of an aircraft to calibrated airspeed control of the aircraft is shown. In step 601, the changeover (target) calibrated airspeed is entered in the data processing system by the flight deck. In step 602, the current calibrated airspeed, the true airspeed, the flight path acceleration, and the static pressure are determined. In step 603, the predicted calibrated airspeed is calculated. In step 604, a determination is made whether a preselected calibrated airspeed has been entered in the data processing system. When a preselected calibrated airspeed has been entered in the data processing system, then a determination is made whether the predicted calibrated airspeed is equal to the current airspeed in step 605. When the predicted calibrated airspeed is not equal to the current airspeed, then the procedure is returned to step 602. When the predicted calibrated airspeed is equal to the current airspeed, then in step 606, the preselected calibrated airspeed is the new target calibrated airspeed. When, in step 604, a preselected calibrated airspeed has not been entered in the data processing system, a determination is made whether the aircraft altitude is equal to or below 26,000 ft. When the altitude of the aircraft is not below 26,000 ft, the procedure is returned to step 601 where the option to preselect a target calibrated airspeed can be implemented. When the aircraft altitude is equal or below 26,000 ft, the determination is made whether aircraft is maintaining the selected (target) Mach number in step 608. Typically, the aircraft will maintain within specified limits the selected Mach number in the absence of a change resulting in a transient condition, such as a recent selection of a new selected (target) Mach number. When the selected Mach number is being maintained within specified limits, then the predicted calibrated airspeed value is selected as the target calibrated airspeed value in step 609. When the selected Mach number is not being maintained in step 608, then target calibrated airspeed is the equivalent calibrated airspeed resulting from the current Mach number in step 610. In step 611, transfer of control of the aircraft to the new calibrated airspeed is performed in response to step 606, step 609, or step 610.

Figure 7:
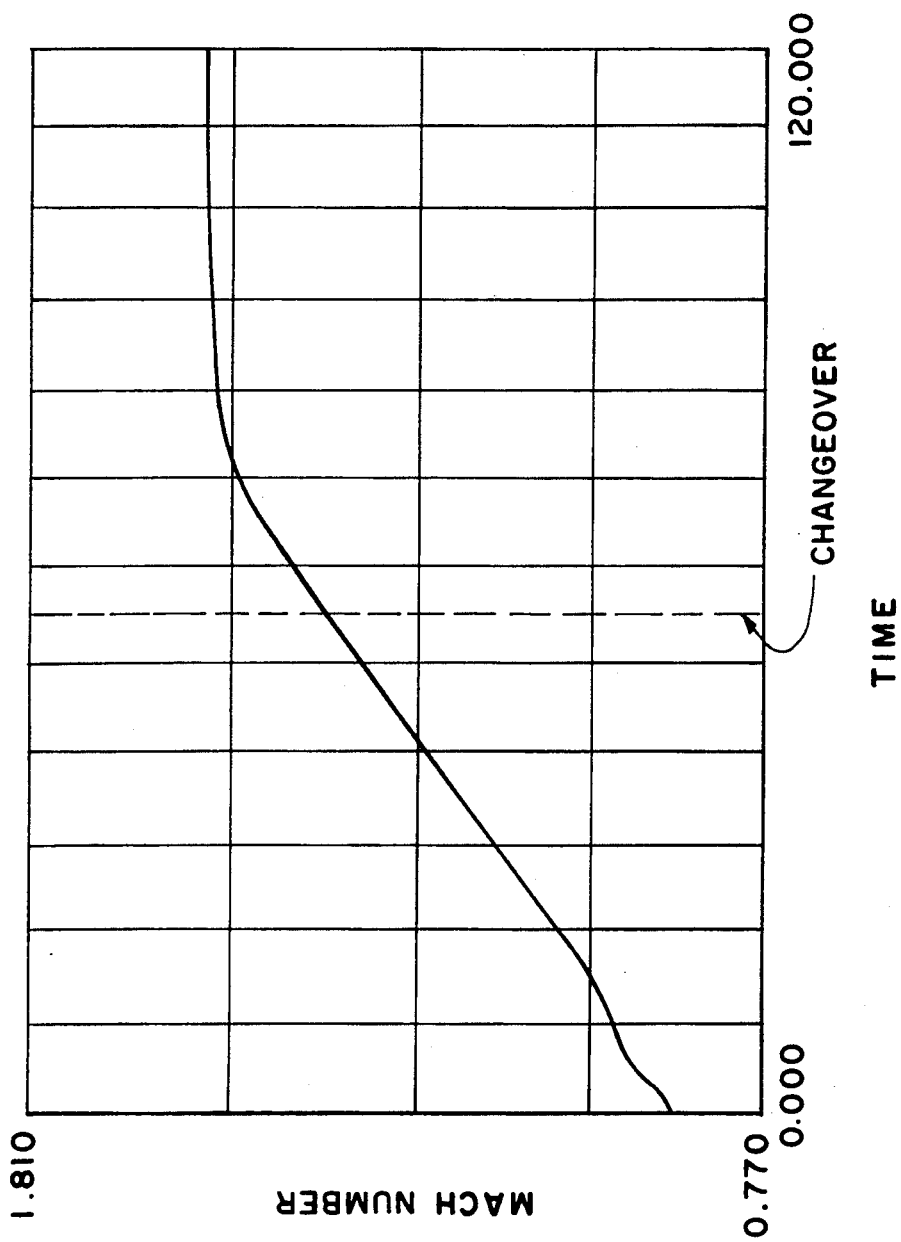
FIG. 7 illustrates the auto-changeover from the calibrated airspeed aircraft control to the Mach number aircraft control.

Referring to FIG. 7, the auto-changeover from the control of an ascending aircraft by the calibrated airspeed parameter to control of the aircraft by the Mach number parameter. The transition point occurs at the time designated by the dotted line. The preselected Mach number is 0.8. Only minor overshoot is experienced in the transition.

Figure 8:
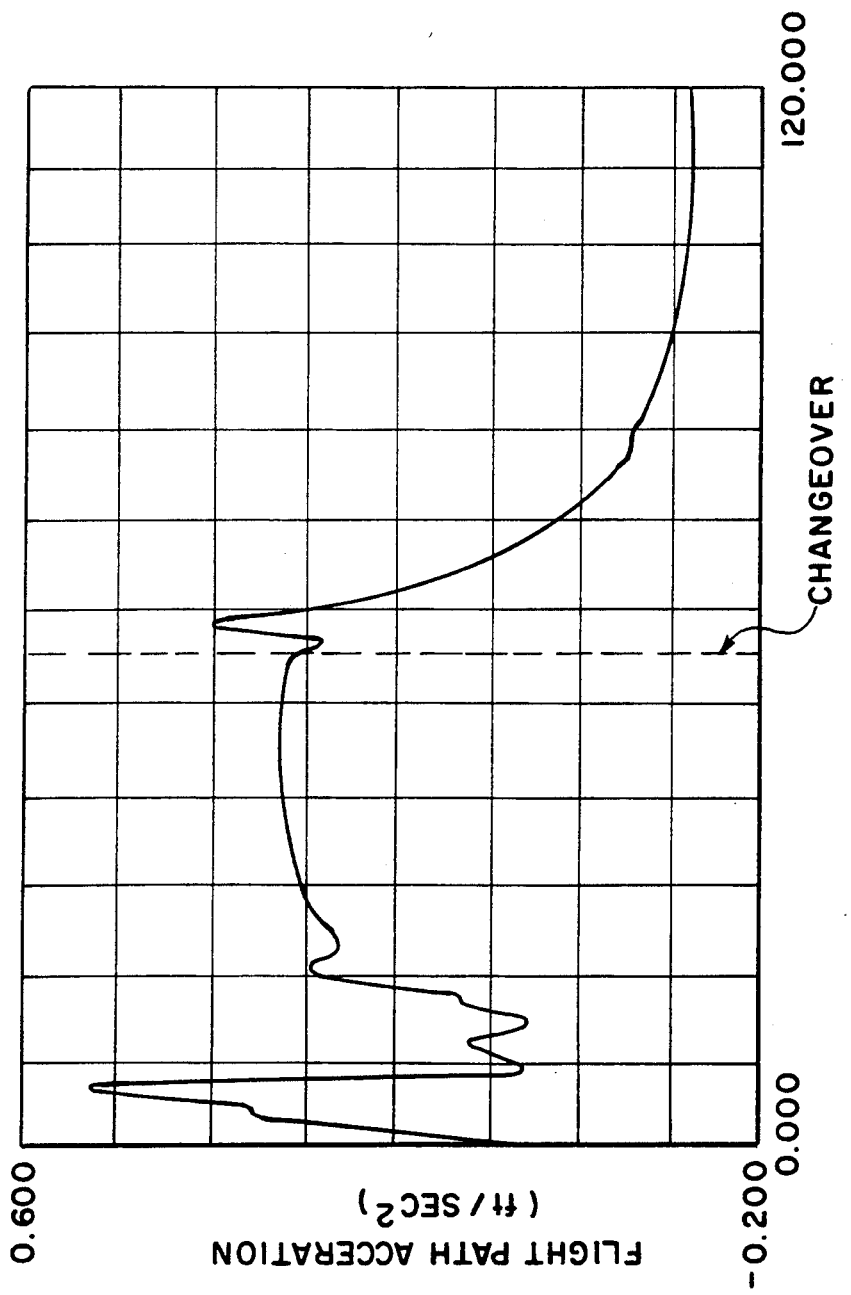
FIG. 8 illustrates the flight path acceleration for the auto-changeover from the calibrated airspeed parameter to the Mach number parameter according to the present invention.

Referring to FIG. 8, the flight path acceleration for the transition between the calibrated airspeed parameter and the Mach number parameter control of the aircraft according to the present invention, is shown. As in FIG. 7, the auto-changeover occurs at the dotted line. The acceleration changes from positive to negative.

Figure 9:
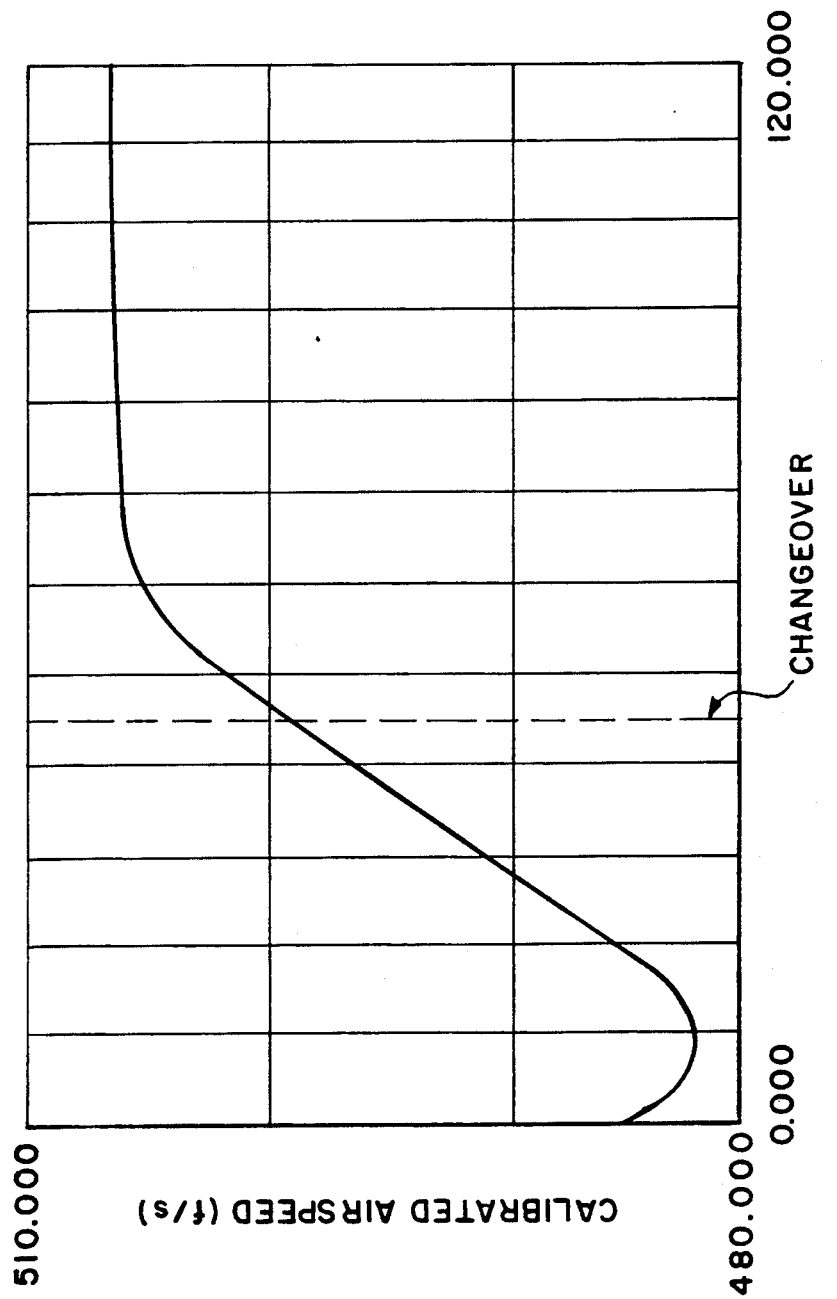
FIG. 9 illustrates the Mach number to calibrated airspeed auto-changeover according to the present invention.

Referring now to FIG. 9, the auto-changeover from aircraft Mach number parameter control to the calibrated airspeed parameter control according to the present invention is shown. The preselected calibrated airspeed is 300 knots (506.3 ft/sec). The changeover occurs at the dotted line. The overshoot resulting from the transition is minimal.

Figure 10:
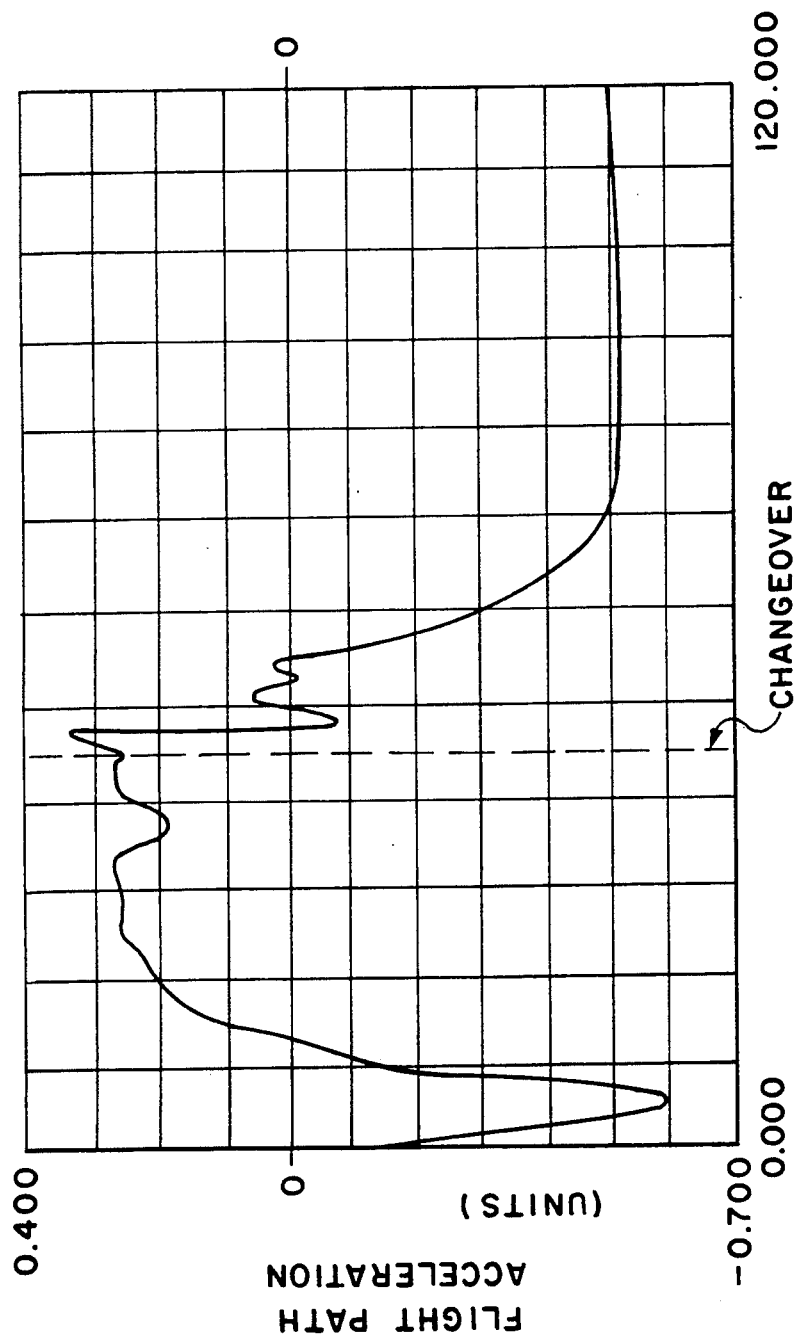
FIG. 10 illustrates the flight path acceleration for the Mach number to calibrated airspeed auto changeover according to the present invention.

Referring now to FIG. 10, the flight path acceleration for the auto-changeover from the Mach number parameter control of the aircraft to the calibrated airspeed control of the aircraft according to the present invention is shown. The auto-changeover occurs at dotted line. Note that the flight path acceleration approaches a negative value greater in magnitude than the acceleration prior to changeover.

Figure 11:
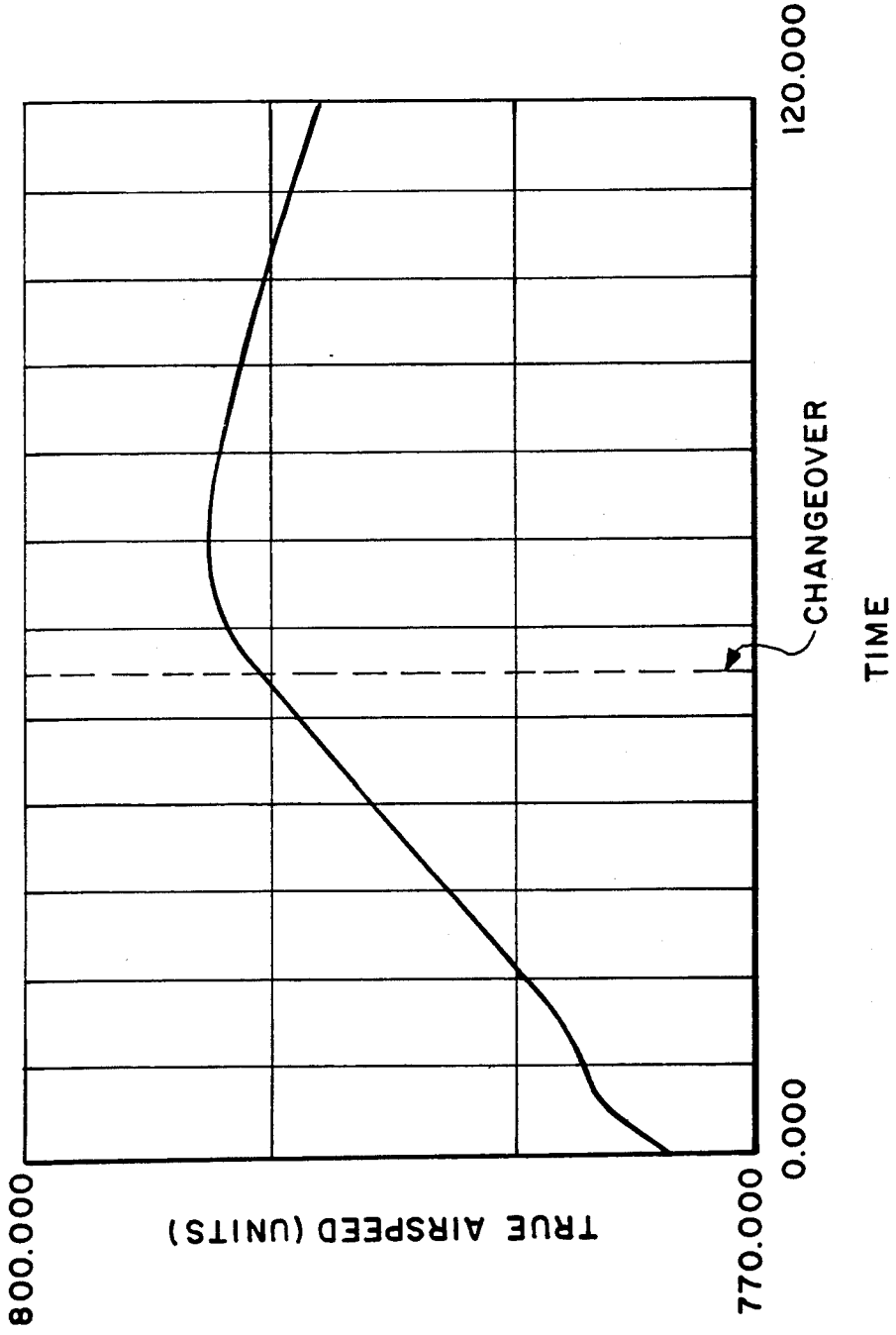
FIG. 11 illustrates the true airspeed of the aircraft during the auto-changeover from calibrated airspeed parameter control of the aircraft to Mach number parameter control of the aircraft.
Figure 12:
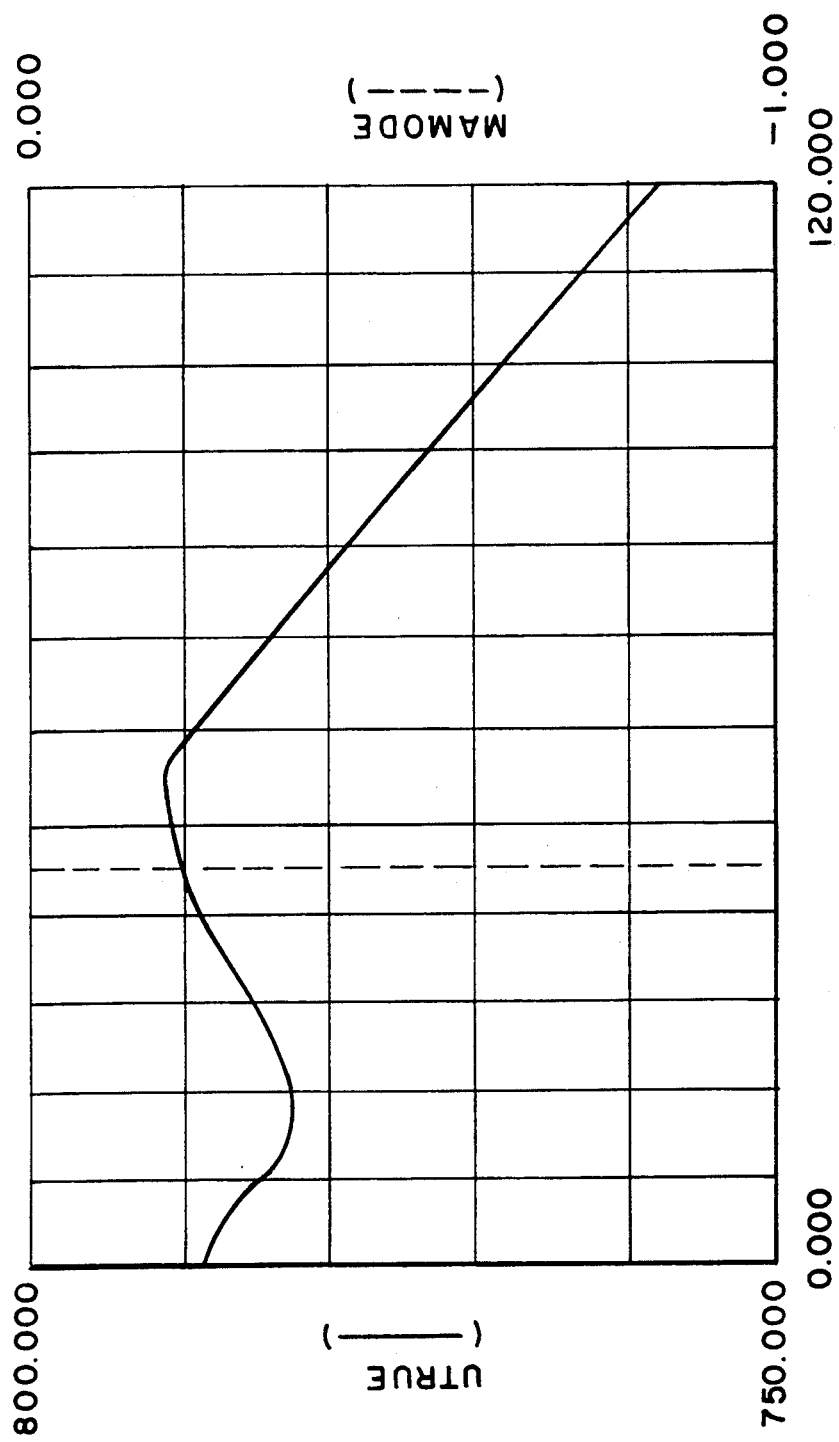
FIG. 12 illustrates the true airspeed of the aircraft during the auto-changeover from Mach number control of the aircraft to calibrated airspeed control of the aircraft.

Referring to FIG. 11 and FIG. 12, the true airspeed for the auto-changeover from the calibrated airspeed parameter control of the aircraft to the Mach number control of the aircraft and from the Mach number control of the aircraft to the calibrated airspeed, respectively, according to the present invention is shown. The transitions occur between the 300 knot calibrated air speed and the 0.8 Mach number.

Figure 13:
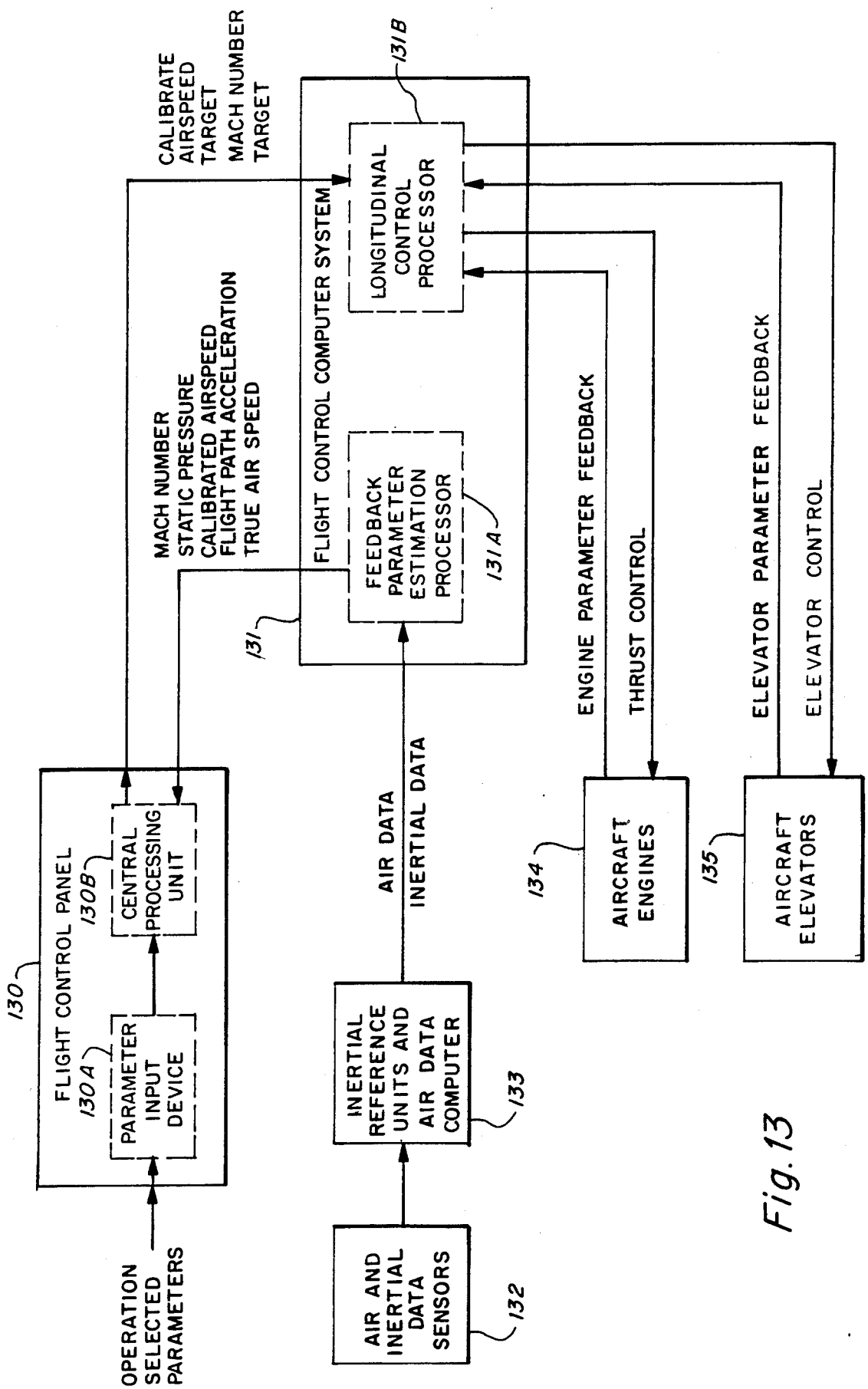
FIG. 13 is a block diagram of the apparatus used by the aircraft in the executing the auto-changeovers between the calibrated airspeed control parameter and the Mach number control parameter.

Referring to FIG. 13, the apparatus needed to implement the auto-changeover between the calibrated airspeed and the Mach number aircraft control parameters according to the present invention is illustrated. Flight control panel 130 receives operator selected parameters entered through parameter input device 130A. The parameters entered by the parameter input device 130A are applied to central processing unit 130B, the central processing unit 130B forming part of the flight control panel 130. The central processing unit 130B applies the calibrated airspeed target and the Mach number target to the longitudinal control processor 131B forming part of the flight control computer system 131. The longitudinal control processor 131B applies elevator control signals to the aircraft elevators 135 and thrust control signals to the aircraft engines 134 and the longitudinal control processor 131B receives elevator parameter feedback signals from the aircraft elevators 135 and receives engine parameter feedback signals from the aircraft engines 134. The longitudinal control processor 131B also receives signals from the feedback parameter estimation processor 131A, the feedback parameter estimation processor 131A forming part of the feedback control computer system. The feedback parameter estimation processor 131A applies signals (such as Mach number, static pressure, calibrated airspeed, flight path acceleration and true airspeed) to the central processing unit. The feedback parameter estimation processor 131A receives air data and inertial data signals from the inertial reference units and air data computer 133. The inertial reference units and air data computer 133 receive signals from the air and inertial data sensors 132 measuring parameters associated with the aircraft. Examples of air data sensors would be thermometers, pressure gauges, etc. for measuring parameters of the environment of the aircraft, while examples of inertial data sensors include accelerometers, gyroscopes, etc. for measuring parameters associated with the aircraft.

Operation of the Preferred Embodiment

The invention differs from the prior art in that the approach of a control parameter auto-changeover is predicted for preselected changeover values of the parameter. The prediction is based on the flight path acceleration, true air speed and known aircraft response to control commands. The parameter changeover is affected, based on the predicted parameter values, before the actual parameter changeover value is reached to prevent overshoot of the target control parameter.

The algorithm used to predict the changeover point between the calibrated airspeed parameter control and the Mach number control of the aircraft assumes that the change in flight path acceleration (FPACC) of the aircraft is exponential for small errors with a known time constant TAU. Currently, the flight path acceleration response of an aircraft lags a command by approximately 6 seconds. The change in the true airspeed is given by:

$$\text{Delta}(TAS) = \int_{t=0}^{t=\infty} FPACC\, dt = FPACC_d \int_{t=0}^{t=\infty} e^{-(t/TAU)} dt$$
$$= -FPACC_d * TAU * e^{-(t/TAU)} \bigg|_{t=0}^{t=\infty} = -FPACC_d * TAU(0-1)$$
$$= FPACC_d * TAU;$$

(5.)

where $FPACC_d$ is the difference between the initial flight path acceleration and the final flight path acceleration (the final flight path acceleration required to hold a specific calibrated airspeed or Mach number during a constant vertical speed maneuver, i.e., $FPACC_d = FPACC_i - FPACC_f$).

For the change in the Mach number, the relationship used includes:

$$\text{Delta}(TAS)/TAS = \text{Delta}(Mach)/Mach$$

Therefore, the change in the Mach number is:

$$\text{Delta}(Mach) = (FPACC_d \times TAU) \times Mach \qquad 6.$$

The predicted Mach, the Mach number that will be current after the changeover, is then Mach+Delta(Mach). When the preselected Mach number is within +/−0.0005 Mach (or 0.5 milliMach) of the predicted Mach number, then the auto-changeover takes place. The expression is therefore:

$$\text{Predicted Mach} = [(FPACC_d \times TAU/TAS) + 1] Mach \qquad 7.$$

The changeover to the calibrated airspeed from the Mach number is determined by the approximation:

$$\text{Delta}(TAS)/TAS = \text{Delta}(CAS)/CAS$$

$$\text{Predicted CAS} = (FPACC_d \times TAU/TAS + 1) \times CAS \qquad 8.$$

The final $FPACC_f$ is approximated, in the preferred embodiment in the following manner. Because $FPACC_f$ is the time derivative of the true airspeed (TAS), equation 1 can be used in the approximation. The intrinsic function performed on the calibrated airspeed (CAS) are a square, a 7/2 power, a 2/7 power, and a square root. To some degree of approximation, the true airspeed and, ultimately, $FPACC_f$ is proportional to the calibrated airspeed (CAS). The true airspeed (TAS) and the final flight plan acceleration ($FPACC_f$) are approximately proportional to the square root of the pressure ratio. The temperature dependence is ignored, assumed to be accounted for in the vertical speed. Because the flight plan acceleration is a result of holding the calibrated airspeed at a constant vertical speed, VS, $FPACC_f$ is proportional to the vertical speed. Therefore:

$$FPACC_f = VS \times CAS/[K1 \times (P/P_o)^{\frac{1}{2}}] \qquad 11.$$

Using a similar procedure wherein the Mach number is held, the true airspeed, TAS, and, ultimately, the flight path acceleration, $FPACC_f$ is proportional to the Mach number and to the vertical speed, VS. Therefore:

$$FPACC_f = VS \times Mach/K2 \qquad 12.$$

The constants of proportionality are determined by computation of the complete equations for several conditions and providing the best fit for K1 and K2. Using this procedure, K1 is found to be approximately 70,000, while K2 is found to be approximately −257. When the selection is based on the altitude (e.g., 26,000 ft), then the changeover will occur at 26,000 ft altitude. Upon reaching or crossing the 26,000 ft altitude and when the calibrated airspeed of Mach number target has been captured, the changeover is forced at the current parameter levels. When the calibrated airspeed target or the Mach number target has not been captured and the 26,000 ft level has been crossed, then the target Mach number (TMach) and the target calibrated airspeed (TCAS) are given by the expressions:

$$TMach = \{5[\{(P_o/P)[\{1+0.2(TCAS/C_o)^2\}^{3.5}-5\}+1\}^{2/7}-1]\}^{\frac{1}{2}} \qquad 9.$$

$$TCAS = C_o\{5[\{P/P_o)[\{(TMach^2)/5+1\}^{3.5}-1+1\}^{2/7}-1]\}^{\frac{1}{2}} \qquad 10.$$

The approximation equations for the $FPACC_f$ are used to minimize the demands on the aircraft data processing apparatus. It will be clear that the complete equations can be used when sufficient computational capacity is available in the aircraft.

The present invention can provide for an autochangeover at a predetermined altitude. Different autochangeover modes are provided depending on whether the aircraft is currently maintaining a target aircraft speed parameter or is currently not maintaining a target aircraft speed (for example, when a new target airspeed has been recently entered).

In the preferred embodiment, the target airspeed or Mach number is determined in the central processing unit, the central processing unit receiving processed signals from environment and equipment sensors. It will be clear that a different arrangement of processing apparatus can perform the same functions.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method for providing a transition between an aircraft controlled by a calibrated airspeed aircraft parameter value and said aircraft controlled by a Mach number parameter value, said method comprising the steps of:

selecting a current parameter value for control of said aircraft prior to said transition;

selecting a selected target parameter value to which control of said aircraft is to be transferred after said transition;

based on current flight conditions and response characteristics of control systems of said aircraft, calculating a predicted target parameter value for said aircraft before said transition from a current parameter value; and transferring control of said aircraft to said selected target parameter value when said predicted target parameter value equals said selected target parameter value.

2. The method of claim 1 wherein current flight conditions of said calculating step includes a constant rate of climb and constant current parameter value.

3. The method of claim 1 further comprising the steps of:

selecting a predetermined altitude; and when said transferring control step has not been executed prior to said aircraft reaching said predetermined altitude, transferring control of said aircraft to said selected target parameter value after passing through said predetermined altitude.

4. The method of claim 1 wherein said calculating step includes a step of providing for flight path acceleration parameters and aircraft response time parameters when calculating said predicted target parameter value.

5. The method of claim 1 wherein when said transition occurs at a predetermined altitude, said method further comprising the steps of:

transferring control to said predicted target parameter value at said predetermined altitude when said current parameter value is being maintained by said aircraft; and transferring control to a target parameter value equivalent to a selected current parameter value when said current parameter value is not being maintained by said aircraft.

6. The method of claim 1 wherein said calculating step includes the step of determining a flight path acceleration for said aircraft to obtain said predicted target parameter value.

7. The method of claim 6 wherein said current parameter values are calibrated airspeeds and said target parameter values are Mach numbers, said calculating step including a step of determining a predicted Mach number from an equation:

Predicted Mach number $= (FPACC_d \times TAU/TAS + 1) \times \text{Mach}$ wherein:

$FPACC_d$ is the final flight path acceleration subtracted from the initial flight path acceleration;

TAU is a response time of said aircraft to control signals;

TAS is a true airspeed; and

Mach is a present Mach number.

8. The method of claim 6 wherein said current parameter values are Mach numbers and said target parameter values are calibrated airspeeds, said calculating step including a step of determining said predicted calibrated airspeed from and equation:

Predicted CAS $= (FPACC_d \times TAU/TAS[=] + 1) CAS$ wherein CAS is a calibrated airspeed, $FPACC_d$ is a difference between an initial flight plan acceleration and a final flight plan acceleration, TAU is an aircraft response time, and TAS is a true airspeed.

9. Electronic apparatus for automatic changeover from a first flight control parameter of an aircraft to a second flight control parameter, said apparatus comprising:

input means responsive to activation by aircraft personnel for entering a preselected second flight control parameter value;

sensor elements for determining flight parameters of said aircraft; and a central processing unit having said flight parameters from said sensor elements applied thereto, said central processing unit determining a predicted value for said second flight control parameter based on said sensor element parameters and a current first flight control parameter value, wherein said central processing unit includes comparison means for comparing said predicted second flight control parameter value with said preselected second flight control parameter, said comparison means providing control signals causing said aircraft to be controlled by said preselected second flight control parameter value when said preselected second flight control parameter value is equal to said predicted second flight control parameter value.

10. The electronic apparatus of claim 9 wherein a one of said sensor elements measures altitude, said central processing unit transferring control of said aircraft to a new second flight control parameter value at a predetermined altitude, wherein said new second flight control parameter value is said predicted second flight control parameter value when a current first flight control parameter is being maintained, said new second flight control parameter value being an equivalent second flight control parameter value equivalent to said current first flight control parameter value when said current first flight control parameter value is not being maintained.

11. The electronic apparatus of claim 10 wherein said first and said second flight control parameter values are selected from a group consisting of calibrated airspeed and Mach number parameter values, wherein said aircraft is changing altitude at a predetermined rate.

12. The electronic apparatus of claim 11 wherein said first flight control parameter value is a calibrated airspeed and said second flight control parameter value is a Mach number when said aircraft has a positive predetermined ascent rate, and wherein said first flight control parameter value is a Mach number and said second flight control parameter value is a calibrated airspeed when said predetermined ascent rate is negative.

13. The electronic apparatus of claim 11 further comprising selectable comparison means for comparing an altitude of said aircraft with a predetermined altitude, said aircraft being controlled by said preselected second flight control parameter after said aircraft passes through said predetermined altitude.

14. The electronic apparatus of claim 12 wherein said central processing unit processes signals from said sensor elements to determine a predicted Mach number according to an approximation relationship:

Predicted Mach number $= (FPACC_d \times TAU/TAS + 1) \times Mach$ wherein:
$FPACC_d$ is a final flight path acceleration subtracted from an initial flight path acceleration;
TAU is a response time of the aircraft to control signals;
TAS is a true airspeed of said aircraft; and
Mach is a present Mach number of said aircraft.

15. The electronic apparatus of claim 12 wherein said central processing unit processes signals from said sensor elements to determine a predicted calibrated airspeed according to an approximation relationship:

Predicted $CAS = (FPACC_d \times TAU/TAS[=] + 1)CAS$ wherein CAS is a calibrated airspeed,
$FPACC_d$ is a difference between an initial flight plan acceleration and a final flight plan acceleration,
TAU is an aircraft response time, and
TAS is a true airspeed of said aircraft.

16. A method of providing an automatic changeover between a calibrated airspeed control parameter value of an aircraft and a Mach number control parameter of an aircraft, said method comprising the steps of:
selecting a selected target control parameter value;
from flight parameters of said aircraft, determining a predicted target control parameter value as a function of a current control parameter value; and
when said predicted value and said selected value are equal, transferring control of said aircraft to said predicted target control parameter value.

17. The method of providing an automatic changeover of claim 16 further including the step of maintaining said current control parameter value and a rate of change in altitude substantially constant prior to said automatic changeover.

18. The method of providing an automatic changeover of claim 16 wherein said transferring control step takes place when said aircraft reaches a predetermined altitude.

19. The method of providing an automatic changeover of claim 16 further comprising, when said automatic changeover is to occur at a predetermined altitude, the steps of:
transferring control to said predicted control parameter value at said predetermined altitude when said current control parameter value is being maintained by said aircraft; and
transferring control to an equivalent target control parameter value which is equivalent to said current control parameter value when said current control parameter value is not being maintained by said aircraft.

* * * * *